US008391936B2

(12) United States Patent
Beyer et al.

(10) Patent No.: US 8,391,936 B2
(45) Date of Patent: Mar. 5, 2013

(54) MAGNETIC LEVITATION DEVICE

(75) Inventors: Christoph Beyer, Dresden (DE); Oliver De Haas, Dresden (DE); Torsten Riederich, Schmoelin (DE); Ludwig Schultz, Dresden (DE)

(73) Assignee: Leibniz-Institut Fuer Festkoerper-und Werkstoffforschung Dresden E.V., Dresden (DE)

( * ) Notice: Subject to any disclaimer, the term of this patent is extended or adjusted under 35 U.S.C. 154(b) by 1379 days.

(21) Appl. No.: 11/815,081

(22) PCT Filed: Jan. 29, 2006

(86) PCT No.: PCT/EP2006/050499
§ 371 (c)(1),
(2), (4) Date: Mar. 26, 2008

(87) PCT Pub. No.: WO2006/079658
PCT Pub. Date: Aug. 3, 2006

(65) Prior Publication Data
US 2008/0207457 A1 Aug. 28, 2008

(30) Foreign Application Priority Data

Jan. 31, 2005 (DE) .......................... 10 2005 005 706

(51) Int. Cl.
*H01L 39/00* (2006.01)
(52) U.S. Cl. ........ 505/150; 104/281; 104/282; 104/283; 104/284; 104/285; 104/286; 335/216; 505/902; 505/903; 505/904
(58) Field of Classification Search .................. 505/150, 505/902–904; 335/216; 104/281–286
See application file for complete search history.

(56) References Cited

U.S. PATENT DOCUMENTS

| | | | |
|---|---|---|---|
| 4,979,445 A | 12/1990 | Lanzara et al. | |
| 5,094,173 A | 3/1992 | Tada et al. | |
| 5,433,149 A | 7/1995 | Kuznetsov et al. | |
| 5,596,303 A * | 1/1997 | Akgun et al. | 335/216 |
| 5,602,430 A | 2/1997 | Kalsi et al. | |
| 5,631,617 A * | 5/1997 | Morishita | 335/216 |
| 5,809,897 A | 9/1998 | Powell et al. | |
| 6,066,270 A | 5/2000 | Eckert et al. | |
| 6,101,952 A * | 8/2000 | Thornton et al. | 104/282 |
| 6,510,799 B2 | 1/2003 | Lamb et al. | |
| 6,899,036 B2 | 5/2005 | Lamb et al. | |
| 7,197,987 B2 | 4/2007 | Falter et al. | |
| 7,204,192 B2 | 4/2007 | Lamb et al. | |
| 2004/0107863 A1 | 6/2004 | Falter et al. | |

FOREIGN PATENT DOCUMENTS

DE 25 11 641 9/1976

OTHER PUBLICATIONS

Article by L. Schultz et al. (Z. Metallkd. 93 (10) 1057-1064 (2002)).
Article by J. Hull et al. (J. Appl. Phys. 86 (11) 6396 (1999)).
Article by J. Wang et al. (Physica C 378-381 (1) 809-814 (2002)).
Article by J. Wang et al. (Physica C 386, 431-437 (2003)).
Article by C. Navau et al. (Supercond. Sci. Technol. 17 (2004) 828-832).
Article by Z. Ren et al. (Physica C 378-381 (1) 873-876 (2002)).

\* cited by examiner

*Primary Examiner* — Paul Wartalowicz
(74) *Attorney, Agent, or Firm* — Greenblum & Bernstein, P.L.C.

(57) ABSTRACT

A magnetic levitation device includes at least two superconductor molded bodies with stored magnetic field configurations above a magnetic guide track. The at least two superconductor molded bodies have at least one of a stored magnetic field configuration with different vertical spacing from the guide track and a stored magnetic field configuration with different horizontal position with respect to the guide track. The at least two superconductor molded bodies are mechanically held in a position deviating from their stored position above the guide track and connected to one another. This abstract is not intended to define the invention disclosed in the specification, nor intended to limit the scope of the invention in any way.

10 Claims, No Drawings

MAGNETIC LEVITATION DEVICE

CROSS-REFERENCE TO RELATED APPLICATIONS

The present application is a U.S. National Stage of International Patent Application No. PCT/EP2006/050499 filed Jan. 29, 2006 which published as WO 2006/079658 on Aug. 3, 2006, and claims priority of German Patent Application No. 10 2005 005 706.3 filed Jan. 31, 2005.

BACKGROUND OF THE INVENTION

1. Field of the Invention

The invention relates to the fields of magnetic and superconductive materials and pertains to a magnetic levitation device as can be used, for example with superconductive contactless transport devices or linear or radial levitation bearings.

2. Discussion of Background Information

Superconductive magnetic levitation devices require a guide track or fixed counterbearing, which provide a magnetic field that is constant along the direction of movement, but perpendicular thereto has a sharp field gradient. The superconductors attached in the movable part (transport car) can adopt a stable position in this magnetic field if they are hard type II superconductors.

Magnetic fields can penetrate type II superconductors in the form of quantized magnetic flux lines that can be held in the superconducting matrix by nanoscale deposits or construction errors. It is thus possible to firmly anchor external magnetic field configurations in a superconductor of this type. If the magnetic field generated by the guide track is anchored in the superconductor at a fixed distance from the guide track from the normal conducting into the superconducting state due to the cooling of the superconductor, the superconductor responds to a deflection from the cooling position with restoring forces that draw the superconductor back into it. The restoring forces are dependent on the change of the magnetic field and thus also on the size of the deflection. The larger the change in the magnetic field, the larger the restoring force.

With superconductive magnetic levitation devices in contactless transport devices and linear or curved levitation bearings, the stability of a certain position in the vertical as well as in the horizontal direction is very important, in addition to the lift force. A measure of the stability is the stiffness in a marked direction. This is given in N/mm and describes what force is necessary to displace the movable part of the magnetic levitation device by 1 mm. However, since the forces are dependent on precisely the deflection around the cooling position, it is not possible to meet high demands in terms of the stiffness of a position with high complete reversal of stress.

With deflections from the cooling position, the increase of the repelling force is disproportionately high, so that for greater deflections, greater forces and stiffnesses can be achieved. In order to achieve a greater stiffness for a transport device, the levitation device is "prestressed." According to the prior art, this is achieved through a high service weight of the transport device compared to the payload. However, this leads to a high energy consumption by the drive unit.

A general overview of the application of hard type II superconductors in magnetic levitation systems and radial bearings is provided by L. Schultz et al. (Z. Metallkd. 93 (10) 1057-1064 (2002)). J. Hull et al. (J. Appl. Phys. 86 (11) 6396 (1999)) shows analytically that the stiffness in the lateral direction present for a certain cooling position is always half of that in the vertical direction. J. Wang et al. (Physica C 378-381 (1) 809-814 (2002)) describe the design of a new levitation system on the basis of superconducting levitation, where they also state (Physica C 386, 431-437 (2003)) that the lateral stiffness of the vehicle increases with increasing mass. C. Navau et al. (Supercond. Sci. Technol. 17 (2004) 828-832) describe a model for calculating states of balance depending on the cooling position. Z. Ren et al. (Physica C 378-381 (1) 873-876 (2002)) describe a method for increasing the vertical and lateral stiffness for a linear transport system through the interaction of superconductors and permanent magnets in the vehicle. The strong repulsive forces between two equal magnetic poles are thereby utilized.

There are therefore indications from the known prior art that, on the one hand, the problem of stiffness for practical applications has been recognized, but, on the other hand, the problem has not been given sufficient consideration nor have actual solutions been identified.

SUMMARY OF THE INVENTION

The invention relates to a magnetic levitation device through which an improved stiffness of the track guidance, even during loading and unloading of the magnetic levitation devices or a stable bearing guidance, is achieved.

The magnetic levitation device according to the invention comprises at least two superconductor molded bodies with stored magnetic field configurations above a magnetic guide track. The at least two superconductor molded bodies have a stored magnetic field configuration with different vertical spacing from the guide track and/or a stored magnetic field configuration with different horizontal position with respect to the guide track, and they are mechanically held in a position deviating from their stored position above the guide track and connected to one another.

Advantageously, two or three superconductor molded bodies have the same stored magnetic field configuration.

Likewise advantageously, the superconductor molded bodies are solid bodies.

Furthermore advantageously, the superconductor molded bodies are hard type II superconductors.

It is also advantageous if at least one superconductor molded body has a magnetic field configuration anchored below the position in which the at least two superconductor molded bodies are mechanically held and the at least other superconductor molded body has a magnetic field configuration anchored above the position in which the at least two superconductor molded bodies are mechanically held. It is particularly advantageous if the spacings of the positions above and below the position in which the at least two superconductor molded bodies are mechanically held are of equal size with respect to this position.

It is also advantageous if at least one superconductor has a magnetic field configuration anchored below and laterally displaced to the right in the direction of movement of the magnetic levitation device of the position in which the at least two superconductor molded bodies are mechanically held, and the at least other superconductor molded body has a magnetic field configuration anchored above and laterally displaced to the left in the direction of movement of the magnetic levitation device of the position in which the at least two superconductor molded bodies are mechanically held. It is in turn particularly advantageous if the spacings of the positions above and below and to the right and to the left of the position in which the at least two superconductor molded bodies are mechanically held, are of equal size with respect to this position in both cases above and below and to the right and to the left.

Through the solution according to the invention, there is realized a new possibility for "prestressing" a magnetic levitation device or a levitation bearing.

To this end a magnetic levitation device comprises at least two superconductor molded bodies above a magnetic guide track. The at least two superconductor molded bodies are thereby positioned at a different spacing above the guide track and are cooled there below their critical temperature. The magnetic field configuration present at the respective position is thereby anchored in the respective superconducting molded body. Subsequently, these superconducting molded bodies are brought to a common position above the magnetic guide track by a mechanical device. This position deviates from the respective positions above the guide track at which the superconductor molded bodies have been cooled and at which they have anchored the magnetic field configuration there. The restoring forces of the superconductor molded bodies act through the mechanical holding in a position deviating from the cooling position. These restoring forces effect a certain positioning of the entire magnetic levitation device in a balanced position above the guide track, at which position the sum of the restoring forces is equal to zero, i.e., at which a balance of the amounts of the forces acting on the magnetic levitation device above the magnetic guide track is achieved.

A zone of a greater stiffness is thus realized around the superconductor molded bodies, which also leads to a greater stiffness of the entire magnetic levitation device.

One particularly advantageous embodiment of the invention includes at least two superconductor molded bodies. At least one superconductor molded body has a stored magnetic field configuration below the position at which the at least two superconductor molded bodies are held mechanically, and the at least other superconductor molded body has a stored magnetic field configuration above the position at which the at least two superconductor molded bodies are held mechanically.

Through the subsequent positioning at a height between these two stored positions and the mechanical holding there of the at least two superconductor molded bodies, the one superconductor molded body is forced out of its stored position into a locally higher position and the other superconductor molded body is forced out of its stored position into a locally lower position, in each case above the magnetic guide track. Due to this deflection from the stored position, the respective restoring forces act with attractive power with respect to the guide track through the superconductor molded body forced upwards, and with repulsive power through the superconductor molded body forced downwards. If the amounts of these forces acting in opposite directions are not of equal size, the entire magnetic levitation device is moved in the direction of the force with the greater amount, until a balance of the amounts of the forces acting with respect to the guide track is achieved.

Another possibility for increasing the stiffness is not only realizing the stored positions at different heights above the guide track but also realizing the stored position in different positions in the transverse direction to the direction of movement of the magnetic levitation device above the guide track. The positioning during the storage of the magnetic field configuration can thereby occur only at different heights or in different transverse positions, but advantageously as a mixture of both possibilities at different heights as well as at the same time in different transverse positions with respect to the guide track.

The additional advantage of the different stored positions in the transverse direction lies not only in a further improvement of the stiffness of the entire magnetic levitation device, but also in an increase in the levitating force of the magnetic levitating device above the guide track.

A high stiffness of magnetic levitation devices, even with high requirements, is achieved through the solution according to the invention. This relates, e.g., to the maintenance of the stiffness of a transport device above the guide track even during loading and unloading or the observance of a high precision of a linear levitation bearing or radial levitation bearing. The essential features of a superconducting magnetic levitation device, i.e., the freedom from friction, the freedom from abrasion, and a non-mechanical bearing, are maintained.

The solution according to the invention is suitable, in particular, for small transport devices in clean surroundings, such as one where a virtually noiseless operation without contamination by particles can be realized.

The invention also provides for a magnetic levitation device comprising at least two superconductor molded bodies with stored magnetic field configurations above a magnetic guide track. The at least two superconductor molded bodies have at least one of a stored magnetic field configuration with different vertical spacing from the guide track and a stored magnetic field configuration with different horizontal position with respect to the guide track. The at least two superconductor molded bodies are mechanically held in a position deviating from their stored position above the guide track and connected to one another.

The at least two superconductor molded bodies may have the same stored magnetic field configuration. The at least two superconductor molded bodies may be solid bodies. The at least two superconductor molded bodies may be hard type II superconductors. At least one of the at least two superconductor molded bodies may have a magnetic field configuration anchored below the position in which the at least two superconductor molded bodies are mechanically held and at least another of the at least two superconductor molded bodies may have a magnetic field configuration anchored above the position in which the at least two superconductor molded bodies are mechanically held. A spacing of the position above is equal to a spacing of the position below. At least one of the at least two superconductor molded bodies may have a magnetic field configuration anchored below and laterally displaced to the right in a direction of movement of the magnetic levitation device of the position in which the at least two superconductor molded bodies are mechanically held, and at least another of the at least two superconductor molded bodies may have a magnetic field configuration anchored above and laterally displaced to the left in the direction of movement of the magnetic levitation device of the position in which the at least two superconductor molded bodies are mechanically held. A spacing of the position above may be equal to a spacing of the position below, wherein a spacing of the position to the right is equal to a spacing of the position to the left, and wherein a spacing of the positions to the right and left is equal to a spacing of the positions above and below.

The invention also provides for a method of setting a permanent height of a vehicle of a magnetic levitation device arranged above a magnetic guide track, wherein the method comprises mounting at least two superconductors in the vehicle, moving one of the at least two superconductors until it is positioned at a first position above a center of a rail surface of a rail, moving another of the at least two superconductors until it is positioned at a second different position above the center of the rail surface, and moving the at least two superconductors to a common position from the first and second positions and connecting them to one another.

The method may further comprise cooling the at least two superconductors in the first and second positions, whereby a magnetic field configuration preset through a magnetic field of the rail is anchored in the at least two superconductors. The method may further comprise, after the at least two superconductors are moved to a common position, cooling the at least two superconductors in the first and second positions, whereby a magnetic field configuration preset through a magnetic field of the rail is anchored in the at least two superconductors. The moving the at least two superconductors to a common position may occur after the moving another of the at least two superconductors until it is positioned at a second different height above the center of the rail surface. The at least two superconductors may comprise three superconductors. The moving the at least two superconductors to a common position and connecting them to one another may comprise moving the at least two superconductors with a mechanical device to a common position and permanently attaching them to the mechanical device. The method may utilizes a hollow cylinder and a rotor.

The invention also provides for a method of setting a lateral stiffness of a magnetic levitation device, wherein the method comprises moving one of at least two superconductors until it is positioned at a first position above a center of a rail surface of a rail, moving another of the at least two superconductors until it is positioned at a second different position above the center of the rail surface, and moving the at least two superconductors to a common position.

The method may further comprise mounting the at least two superconductors in a vehicle of a magnetic levitation device arranged above a magnetic guide track. The method may utilize a hollow cylinder and a rotor. The method may further comprise, after the moving the at least two superconductors to a common position, connecting them to one another. The method may further comprise cooling the at least two superconductors in the first and second positions, whereby a magnetic field configuration preset through a magnetic field of the rail is anchored in the at least two superconductors.

EMBODIMENTS OF THE INVENTION

The invention is explained in more detail below based on several exemplary embodiments.

Example 1

With a linear magnetic levitation device design, a magnetic rail of two NdFeB permanent magnets (height 50 mm, width 40 mm) is utilized as magnetic guide track. The magnets are installed in a yoke of soft magnetic plates of free-cutting steel (thickness: center 12 mm, edge 3 mm) such that like magnetic poles are opposite one another. The direction of the movement of the magnetic levitation device above the rail is thus preset. This results in a width of the rail of 98 mm and a height of 50 mm. The length of the rail is 150 mm. The soft magnetic material acts as a collector and amplifier for the magnetic field of the permanent magnets. A homogeneous magnetic field is thus produced above the rail in the direction of movement along the guide track (longitudinal direction). In the other two spatial directions above the guide track (in the width and height direction), the respective magnetic field is very inhomogeneous. The maximum amount of the vertical components of the magnetic field lies precisely above the center of the width of the magnetic rail along the guide track and is 0.5 mm above the rail surface 1.1 T (Tesla) and 10 mm above the rail surface 0.5 T.

The superconductors are two 90×35×15 $mm^3$ YBaCuO blocks (hard type II superconductors) that have been produced in the melt texturing method with respectively three seed crystals.

The two superconductors are mounted in the vehicle of the magnetic levitation device. This vehicle is a cryostat with the interior dimensions 110×80×60 $mm^3$. The superconductors can now be moved by a mechanical device in the cryostat in order to set a desired position. One superconductor block is now positioned at the mechanical device at a height of 10 mm above the center of the rail surface and the other superconductor block at a height of 20 mm above the center of the rail surface. In these positions, the superconductors in the cryostat are cooled to a temperature of 77 K (−196° C.) and kept at this temperature. With these two stored positions, the magnetic field configuration preset through the magnetic field of the rail is anchored in the superconductors. Subsequently, both superconductor blocks are brought into a common position through the mechanical device and permanently attached there. Due to the balance of forces, the permanent height of the vehicle above the rail surface is 13 mm.

The measurement of the lateral stiffness yielded a value of 16.7 N/mm.

Example 2

Prior Art

A device according to example 1 likewise contains two superconductor blocks, the stored position of which for the magnetic field configuration of the magnetic field of the rail is in each case 20 mm above the rail surface.

Due to the weight of the vehicle, both superconductors are positioned at a height of 15 mm above the rail.

The measurement of the lateral stiffness yielded a value of 12.7 N/mm.

Example 3

A device according to example 1 contains three superconductor blocks according to example 1, which are arranged in a group of three along the guide track. The stored position of the superconductors for the magnetic field configuration of the magnetic field of the rail in the group of three is such that the central superconductor block has anchored the magnetic field configuration of the magnetic field of the rail at a height of 5 mm, and the two outer superconductor blocks at a height of 20 mm above the rail surface. Subsequently, all three superconductor blocks are brought into a common position by the mechanical device and permanently attached there. Due to the balance of forces, the permanent height of the vehicle above the rail surface is 15 mm.

The measurement of the lateral stiffness yielded a value of 16.9 N/mm.

Example 4

With a device according to example 1 with two superconductor blocks. A stored position of one of the superconductor blocks for the magnetic field configuration of the magnetic field of the rail is realized at a height of 20 mm and that of the other superconductor block at a height of 5 mm above the rail surface. Subsequently, the superconductor blocks are brought into a common position by the mechanical device and permanently attached there. Due to the balance of forces, the permanent height of the vehicle above the rail surface is 10 mm.

The measurement of the lateral stiffness yielded a value of 19.9 N/mm.

Example 5

Prior Art

Utilizing a radial levitation bearing, a superconducting hollow cylinder is assembled from eight YbaCuO blocks. The cylinder has an outer diameter of 55 mm, an inner diameter of 41 mm and a length of 50 mm. The bearing, with a diameter of 40 mm and a length of 50 mm, is inserted into the interior of the hollow cylinder. The rotor of the bearing comprises a stack of permanent magnets and iron disks, adjacent magnets having an opposite polarity. The iron disks act as a collector for the magnetic field. A homogeneous magnetic field is thereby produced in the direction of rotation. In the two other spatial directions (radial and axial) the respective magnetic field is very inhomogeneous. Before the device is cooled, a spacer is inserted into the gap between hollow cylinder and rotor such that a spacing of 0.5 mm from the hollow cylinder is realized around the entire circumference of the rotor. During the cooling of the entire arrangement to a temperature of 77 K (−196° C.), the magnetic field is anchored in this position in the superconductor blocks. The device is kept at this temperature. After the spacer has been removed, a gap of 0.5 mm remains between hollow cylinder and rotor.

The measurement of the lateral stiffness yielded a value of 160 N/mm in the radial direction.

Example 6

With a radial levitation bearing according to example 5, the rotor is likewise at a radial spacing of respectively 0.5 mm from the hollow cylinder and in a position displaced by 1 mm in the axial direction of the position conforming in terms of their lengths together with the hollow cylinder, but only half the superconductor with respect to the length, is cooled to a temperature of 77 K (−196° C.) and kept there. Subsequently the rotor is displaced by −1 mm of the position conforming in terms of their lengths and the rest of the hollow cylinder is cooled to a temperature of 77 K (−196° C.) and kept there.

The position resulting after the balance of forces is the position of the hollow cylinder and of the rotor conforming in terms of the lengths and also the ideal position.

The measurement of the lateral stiffness yielded a value of 240 N/mm in the radial direction.

The invention claimed is:

1. A magnetic levitation device comprising:
    at least two superconductor molded bodies comprising different stored magnetic field configurations above a magnetic guide track;
    at least one of:
        the stored magnetic field configuration of one of the at least two superconductor molded bodies being different in vertical spacing with respect to the guide track than the stored magnetic field configuration of another of the at least two superconductor molded bodies, and
        the stored magnetic field configuration of one of the at least two superconductor molded bodies being different in horizontal position with respect to the guide track than the stored magnetic field configuration of another of the at least two superconductor molded bodies; and
    the at least two superconductor molded bodies being mechanically held in a position above the guide track deviating from a position establishing the different stored magnetic field configurations and being connected to one another.

2. The device of claim 1, wherein at least one of the at least two superconductor molded bodies has a magnetic field configuration anchored below the position in which the at least two superconductor molded bodies are mechanically held and wherein at least another of the at least two superconductor molded bodies has a magnetic field configuration anchored above the position in which the at least two superconductor molded bodies are mechanically held.

3. The device of claim 2, wherein a spacing of the position above is equal to a spacing of the position below.

4. The device of claim 1, wherein at least one of the at least two superconductor molded bodies has a magnetic field configuration anchored below and laterally displaced to the right in a direction of movement of the magnetic levitation device of the position in which the at least two superconductor molded bodies are mechanically held, and wherein at least another of the at least two superconductor molded bodies has a magnetic field configuration anchored above and laterally displaced to the left in the direction of movement of the magnetic levitation device of the position in which the at least two superconductor molded bodies are mechanically held.

5. The device of claim 4, wherein a spacing of the position above is equal to a spacing of the position below, wherein a spacing of the position to the right is equal to a spacing of the position to the left, and wherein a spacing of the positions to the right and left is equal to a spacing of the positions above and below.

6. The device of claim 1, wherein the at least two superconductor molded bodies comprise three superconductor molded bodies and two of the three superconductor molded bodies have the same stored magnetic field configuration.

7. The device of claim 1, wherein the at least two superconductor molded bodies are solid bodies.

8. The device of claim 1, wherein the at least two superconductor molded bodies are hard type II superconductors.

9. A magnetic levitation device comprising:
    at least two type II superconductor molded bodies comprising stored magnetic field configurations above a magnetic guide track;
    the stored magnetic field configuration of a first of the at least two superconductor molded bodies being different in horizontal and vertical spacing with respect to the guide track than the stored magnetic field configuration of a second of the at least two superconductor molded bodies; and
    the first and second superconductor molded bodies being mechanically held in a position deviating from a position above the guide track presetting the stored magnetic field configurations and being connected to one another.

10. A magnetic levitation device comprising:
    a first superconductor molded body comprising a first stored magnetic field configuration established in relation to a magnetic guide track;
    a second superconductor molded body comprising a second stored magnetic field configuration established in relation to the magnetic guide track;
    at least one of:
        the first stored magnetic field configuration being preset with a different horizontal spacing with respect to the guide track than the second stored magnetic field configuration, and
        the first stored magnetic field configuration being preset with a different vertical spacing with respect to the guide track than the second stored magnetic field configuration; and
    the first and second superconductor molded bodies being mechanically held in a position different from a position presetting the first and second stored magnetic field configurations.

* * * * *